United States Patent [19]

Fenster et al.

[11] Patent Number: 4,590,518
[45] Date of Patent: May 20, 1986

[54] ARRANGEMENT FOR PROCESSING DATA IN DIGITAL FLUOROGRAPHIC SYSTEMS

[75] Inventors: Paul Fenster, Petach Tikvah; Dan Inbar, Haifa, both of Israel

[73] Assignee: Elscint Ltd., Haifa, Israel

[21] Appl. No.: 551,700

[22] Filed: Nov. 14, 1983

[51] Int. Cl.⁴ .......................... H04N 5/32; H04N 7/01; H05G 1/64
[52] U.S. Cl. ...................... 358/111; 378/99; 358/140
[58] Field of Search ................ 378/99, 100; 358/111, 358/140, 183

[56] References Cited

U.S. PATENT DOCUMENTS

| 4,079,417 | 3/1978 | Scudder, III | 358/111 |
| 4,266,242 | 5/1981 | McCoy | 358/183 |
| 4,444,196 | 4/1984 | Stein | 358/111 |
| 4,467,355 | 8/1984 | Matsuda | 358/183 |
| 4,494,141 | 1/1985 | Altekruse | 358/111 |

OTHER PUBLICATIONS van Buul et al., Phillips Research Reports, "Standards Conversion of a T.V. Signal with 625 Lines into a Videophone Signal with 313 Lines", vol. 28, No. 4, pp. 377-390, Aug. 1973.

Primary Examiner—Craig E. Church
Assistant Examiner—Charles F. Wieland
Attorney, Agent, or Firm—Sandler & Greenblum

[57] ABSTRACT

A digital fluorographic system for displaying images comprising video and multi format display means which are each provided image data from large size matrices (1024×1024). The data is compressed and is provided to the video display at speeds that preclude the necessity of using broad bandwidth equipment.

10 Claims, 2 Drawing Figures

ARRANGEMENT FOR PROCESSING DATA IN DIGITAL FLUOROGRAPHIC SYSTEMS

FIELD OF THE INVENTION

This invention is concerned with medical diagnostic imaging and more particularly with such imaging using digital fluorographic (DF) systems.

BACKGROUND OF THE INVENTION

In many imaging systems such as digital fluorography the initial images of the objects under study are converted to digital data that is stored in matrix form. The data form of the image is basically used for enhancement and storage purposes.

In general, in the prior art, the matrix sizes correspond to the pixel arrangement of the displayed images. Thus 512×512 matrices are used when the displayed image comprises 512×512 pixels. As is well known one of the limitations on the resolution of a system is the number of pixels in the image, accordingly it is advantageous from the standpoint of resolution to use as many pixels as possible in the image and accordingly as large a matrix as possible to hold the image data.

The matrices currently available commercially are 64×64, 128×128, 256×256, 512×512 and 1024×1024. The 512×512 matrix is currently the most popular matrix for DF usage. The 1024×1024 matrix provides the capability of finer resolution but expensive wide or broad bandwidth equipment is normally required to use the 1024×1024 data for display purposes when the data is transferred at the speeds required for video display.

Thus although the 1024×1024 matrices provide the capability for finer resolution the 512×512 matrix is normally used because of price considerations. It should further be pointed out that satisfactory resolution is obtained with the 512×512 matrices if the system is used to view only a portion of the field. However the resolution is lacking when viewing the complete field.

BRIEF DESCRIPTION OF THE INVENTION

Accordingly it is an object of the present invention to provide methods and systems with the capability of obtaining high resolution images at a cost comparable to present day systems that do not have such high resolution capability.

In accordance with a broad aspect of the invention, a digital fluorographic system for displaying images is provided, said system comprising:

image acquisition means for acquiring images of interior portions of a subject's body, selective display means for selectively providing video displays and/or photographic displays of the acquired image, image matrix means comprising a larger matrix for holding image data; and means for supplying the image data to the display means using equipment having normal bandwidth for use with a smaller matrix and thereby avoiding the high costs attendant with broad bandwidth equipment.

A related feature of the invention comprises using data compression means for supplying the data for a 1024×1024 matrix data to the video display means in the form of 512×512 matrix to obviate the necessity of using broad bandwidth equipment.

Yet another feature of the invention comprises using slow scan equipment to transfer the 1024×1024 matrix data to the photographic display means to obviate the necessity of using broad bandwidth equipment.

BRIEF DESCRIPTION OF THE DRAWINGS

The above mentioned and other features and objects of the present invention will be best understood from the following description of a preferred embodiment of the invention when read in conjunction with the accompanying drawings, in which.

GENERAL DESCRIPTION

Figure 1:
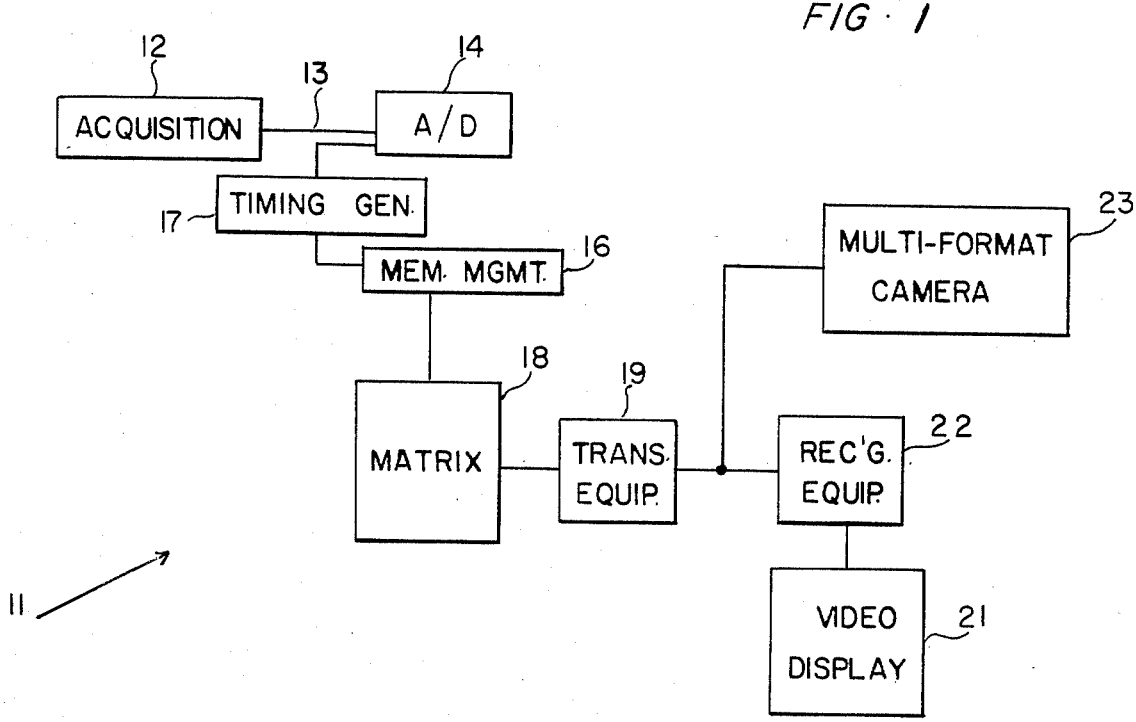
FIG. 1 is a block diagram of a prior art digital fluorographic system.

The digital fluorographic system 11 of FIG. 1 includes image acquisition means 12 typically including an X-Ray source and detector on opposite sides of the object or patient. The detected radiation is focused onto an image intensifier which is exposed to a video camera. The analog video signals on conductor 13 are the output signals from the acquisition means.

The video signals are converted to digital signals by analog to-digital converter 14. The digital signals are operated on in the various ways used to enhance the image in digital fluorographic systems. The mode of transferring the digital signals to the memory matrices such as matrix 18 is controlled by memory management means shown as block 16 under the timing control of generator 17. The memory matrix means are represented in FIG. 1, by matrix block 18.

Equipment such as transfer block 19 is used to read out the matrices for display purposes. The display is in the form of a video image on video display unit 21. The display is provided by the read out data after processing by what is depicted as the receiving equipment 22. The receiving equipment includes well known scanning circuits, typically operating on the analog converted digital data of the matrices.

Alternatively the data can be used to provide photographic displays on video to film cameras, such as multi-format camera 23.

In the prior art of FIG. 1 essentially two different arrangements are used. Where high resolution video images are required without regard to expense; then, the matrix used is a 1024×1024 matrix and the receiving equipment includes the relatively expensive broad bandwidth equipment necessary to receive the data from the matrix during the video scan period. Where economy is a primary consideration, then the matrices are 512×512 and the expensive broad bandwidth equipment is not required.

Figure 2:
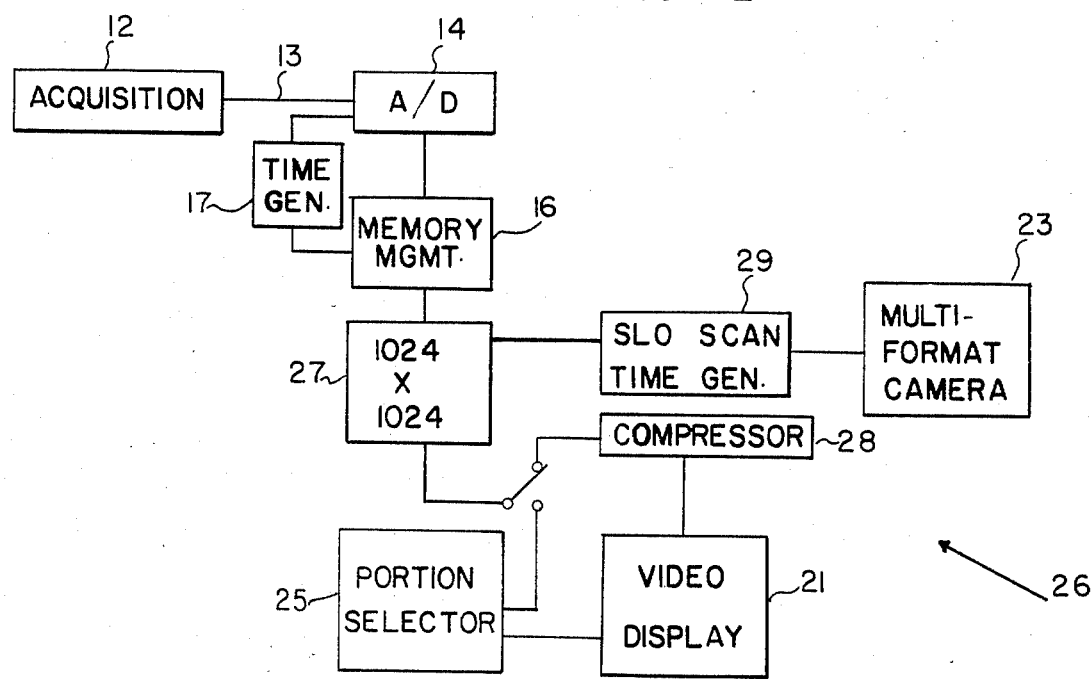
FIG. 2 is a block diagram of an embodiment of the inventive digital fluorographic system showing features thereof.

The inventive example arrangement 26 of FIG. 2 basically separates the transmission of the data from the matrices to the two display modalities, i.e., types of display such as video displays or photographic displays. Thus the system 26 includes the acquisition means 12 coupled to the analog to digital converter 14 over conductor 13. The digital signals are written into 1024×1024 matrice indicated at matrix 27, under the control of the memory management circuitry 16 and timed by timing generator 17. Thus, in the inventive system, the memory definitely uses the bigger matrix. When display on the CRT is required, the use of expensive wide bandwidth receiving equipment is avoided by compressing the data of the 1024×1024 matrices to make it appear as data coming from on 512×512 matrices.

More particularly compression circuitry 28 is used between the matrices and the display means 21. On the other hand, when a high resolution, full 1024×1024 image is required then the option of the transmission of the uncompressed data to the multi-format camera 23 is available. The transmissions accomplished at a relatively slow speed, preferably at ¼ of the frame rate of the 512×512 matrices thereby obviating the requirement for broad bandwidth equipment without adversely affecting the resolution and fidelity of the images. Alternatively, 512×512 portions of the 1024×1024 image can be read out at a slow scan rate by portion selector 25 and displayed on CRT DISPLAY 21, giving a high resolution of a portion of the image.

In operation the inventive system provides the relatively inexpensive video display wherein the relatively lower resolution over the entire detector means is augmented by the extremely high resolution obtained in the images of the multi-format camera. The video display is basically an on-line display while the multi-format camera image is a post acquisition display device. Thus the use of the slow-scan timing generator 29 for keeping the matrix read-out sufficiently slow to preclude the requirement of broad bandwidth equipment has no adverse affect and does not interfere with other functions of the system.

While the invention has been described using specific embodiments it must be emphasized that these embodiments are used by way of example and not as a limitation on the scope of the invention, which is defined by the accompanying claims.

What is claimed is:

1. A digital fluorographic system for displaying fluorographic images, said system comprising: image acquisition means for acquiring digital images for the interior of a subject's body, means for providing video displays of the acquired images, means for providing photographic displays of said acquired images, an image matrix being of a first size for holding digital data, first transfer means for supplying the image data to said video display means as data from a smaller size matrix than said first size matrix, wherein said smaller size matrix is derived from first size matrix, and second transfer means for supplying the data from said first size matrix to said means for providing photographic displays of the first size matrix.

2. The system of claim 1 wherein said first size matrix comprises 1024×1024 elements and said smaller size matrix comprises 512×512 elements.

3. The system of claim 1 wherein said second transferring means comprises slow scanning means.

4. The system of claim 3 wherein said first transfer means comprises compression means such that the data can be transferred without necessitating the use of broad bandwidth equipment.

5. The system of claim 3 wherein said first transfer means comprises portion selector read out means such that the data can be transferred without necessitating the use of broad bandwidth equipment.

6. The system of claim 1 wherein said second transfer means is separate from said first transfer means.

7. The system of claim 6 wherein said first transfer means includes means fast enough to read-out portion of said first sized matrix so that said video display comprises equipment of average bandwidth.

8. The system of claim 7 wherein said first transfer means comprises data compression means.

9. The system of claim 7 wherein said first transfer means comprises portion selector read-out means.

10. The system of claim 8 wherein said first size matrix comrises 1024×1024 elements and said smaller size matrix compises 512×512 elements.

* * * * *